United States Patent [19]
Mimura

[11] Patent Number: 5,461,563
[45] Date of Patent: Oct. 24, 1995

[54] NON-STAGE TRANSMISSION CONTROL SYSTEM

[75] Inventor: Munehiko Mimura, Hyogo, Japan

[73] Assignee: Mitsubishi Denki Kabushiki Kaisha, Tokyo, Japan

[21] Appl. No.: 115,119

[22] Filed: Sep. 2, 1993

[30] Foreign Application Priority Data

Sep. 4, 1992 [JP] Japan .................. 4-236900

[51] Int. Cl.$^6$ .................................. F15B 1/00
[52] U.S. Cl. .............. 364/424.1; 361/152; 361/194; 361/205; 123/479; 123/490; 192/84 R; 192/3.63; 192/3.58; 192/3.31; 477/28; 477/49; 477/174; 477/179; 180/142; 74/336 R; 74/335
[58] Field of Search ............... 364/424.1, 424.06, 364/424.01, 426.04; 361/152, 194, 202, 160, 154, 205; 123/490; 192/84 R, 3.63, 3.58, 3.56, 3.31, 32; 474/28, 11, 12, 17, 18; 477/49, 76, 87, 174, 179, 11, 122, 57, 119, 122, 154, 155, 176, 180, 161; 180/175–179; 74/336 R, 335

[56] References Cited

U.S. PATENT DOCUMENTS

| | | | |
|---|---|---|---|
| 4,283,970 | 8/1981 | Vukovich | 477/161 |
| 4,457,411 | 7/1984 | Hiramatsu | 192/3.31 |
| 4,527,678 | 7/1985 | Pierce et al. | 192/3.58 |
| 4,589,401 | 5/1986 | Karim et al. | 123/479 |
| 4,854,920 | 8/1989 | Mimura | 474/28 |

FOREIGN PATENT DOCUMENTS 62-31533  2/1987  Japan .

*Primary Examiner*—Kevin J. Teska
*Assistant Examiner*—Jacques H. Louis-Jacques
*Attorney, Agent, or Firm*—Sughrue, Mion, Zinn, Macpeak & Seas; Richard C. Turner; Joseph J. Buczynski

[57] ABSTRACT

In a non-stage transmission control system, the output current instruction signal of a microcomputer is provided as a pulse-width-modulated signal, with a result that the number of signal lines from the microcomputer is reduced. Furthermore, the current feedback signal of a solenoid is applied to the microcomputer, for detection of abnormal conditions, and a quick break resistor is connected in series to a feedback diode to increase the current reduction rate of the solenoid.

4 Claims, 5 Drawing Sheets

– 1 –

NON-STAGE TRANSMISSION CONTROL SYSTEM

BACKGROUND OF THE INVENTION

This invention relates to a control system for a motor vehicle non-stage transmission, and more particularly to an electronic control system for controlling the operation of a V-belt type non-stage transmission.

A non-stage transmission control system of this type has been disclosed by Unexamined Japanese Patent Application (Kokai) Sho-62-31533/(1987). The conventional non-stage transmission control system is as shown in FIG. 4. In FIG. 4, reference numeral 1 designates a transmission hydraulic pressure controlling solenoid valve; and 2, a main hydraulic pressure controlling solenoid valve. Each of those solenoid valves is of output hydraulic pressure feed-back type; that is, its output hydraulic pressure is controlled on the balance between itself and the electromagnetic suction force thereof.

Further in FIG. 4, reference numeral 11 designates output hydraulic pressure feedback paths; 12, electromagnetic coils; 13, casings; and 14, movable yokes made of electromagnetic substance which move together with spools 15. Each of the spools 15 is positioned according to the balance between the electromagnetic force and the output hydraulic pressure, to control the output hydraulic pressure. Reference characters $P_R$ and $P_M$ denote a transmission hydraulic pressure and a main hydraulic pressure, respectively, which are determined univocally by currents in the electromagnetic coils 12.

Further in FIG. 4, reference numeral 205 designates a V-belt; 210, an input shaft; 211, an output shaft; 224, a hydraulic pressure pump; 225, an input shaft cylinder; 226, an output shaft cylinder; and 227, an oil filter.

In the transmission control system thus organized, the hydraulic pressures of the cylinders 225 and 226 are controlled with the solenoid valves 1 and 2, to change the radii of rotation of an input shaft pulley and an output shaft pulley, over which the V-belt 205 is laid, thereby to change the speed.

FIG. 5 shows the arrangement of a control section adapted to control the application of current to the solenoid valves 1 and 2. In FIG. 5, reference numeral 100 designates a micro-computer; 101, powder clutch controller; 102, transmission hydraulic pressure controller; 103, main hydraulic pressure controller; 104, a powder clutch; 105 and 106, the hydraulic pressure solenoids of the solenoid valves 1 and 2, respectively; 108, amplifiers for amplifying output signals of the microcomputer 100; 109 and 113, vehicle indication lamps; 110, a warning buzzer; 111 and 112, control solenoids; 114, waveform shaping circuits for shaping pulse signals outputted by a vehicle speed sensor, a clutch number-of-revolutions sensor, and an engine number-of-revolutions sensor, respectively; 115, an A/D (analog-to-digital) converter for converting analog data provided by a throttle opening sensor into digital data; and 116, an input interface circuit for engine control data switches, running control data switches, and so forth.

In the control section, a vehicle speed signal, an engine number-of-revolutions signal, and a clutch number-of-revolutions signal are provided as pulse signals, and their real signals are calculated by using the pulse periods. In addition, a transmission gear ratio is obtained from the number of revolutions of the input shaft 210 (which can be obtained from the number of revolutions of the clutch) and that of the output shaft 211 (which can be detected from the vehicle speed signal).

FIG. 6 shows the arrangement of the transmission hydraulic pressure controller 102 or the main hydraulic pressure control means 103 for controlling the application of current to the hydraulic pressure controlling solenoid valve 1 or 2. In FIG. 6, reference numeral 302 designates a D/A (digital-to-analog) converter; 303, a pulse width modulator for outputting on/off control signals according to a current instruction value Vis from the D/A converter 302, and a current feedback signal $V_{IF}$; 304, a NOT circuit; 309, a base resistor; 305, a current controlling transistor; 351, a feedback diode; 306, a solenoid corresponding to the solenoid 105 or 106 in FIG. 5; 307, a solenoid current detecting resistor; and 308, an amplifier circuit.

The microcomputer 100, receiving various rotation signals, switch signals, and analog signals, controls the application of current to the hydraulic pressure solenoids 1 and 2 thereby to control the main hydraulic pressure and the transmission hydraulic pressure of the non-stage transmission. That is, the microcomputer 100 outputs a digital signal coded with a plurality of signals by logic operation. The digital signal thus outputted is applied to the D/A converter 302, where it is converted into an analog signal; that is, the current instruction signal $V_{IS}$ is obtained. The D/A converter 302 needs a ladder circuit; that is, it is considerably intricate in arrangement. Thus, the use of the D/A converter is disadvantageous in mounting density and in manufacturing cost.

The current of the solenoid 306 is applied through the current detecting resistor 307 to the amplifier circuit 308, where it is amplified into the aforementioned current feedback signal $V_{IF}$. The current feedback signal $V_{IF}$ and the current instruction signal $V_{IS}$ are applied to the pulse width modulator 303, where they are compared with each other to form the on/off control signal. When the current control transistor 305 is conductive (on), current is allowed to flow in the solenoid 306 through the transistor 305. When, on the other hand, the transistor 305 is non-conductive (off), current is allowed to flow in the solenoid 306 through the current detecting resistor 307 and the feedback diode 351.

The conventional control circuit is designed as described above, needing the D/A converter 302. Therefore, the control circuit is unavoidably intricate in arrangement, bulky in size and high in manufacturing cost. In addition, since the current feedback signal $V_{IF}$ is not applied to the microcomputer 100, it is impossible for the microcomputer 100 to determine the occurrence of abnormal conditions. Furthermore, when the current in the solenoid 306 is decreased, the coil impedance of the feedback diode 351 and the solenoid 306 is decreased, and it is impossible to adjust the coil current reduction rate to improve the hydraulic pressure response.

SUMMARY OF THE INVENTION

Accordingly, an object of this invention is to eliminate the above-described difficulties accompanying a conventional non-stage transmission control system. More specifically, an object of the invention is to provide a non-stage transmission control system in which the circuit for controlling the application of current to the hydraulic pressure control solenoid valve is simplified, and the current feedback signal is utilized for detection of the occurrence of abnormal conditions, and the coil current reduction rate is increased to improve the hydraulic pressure response.

In a non-stage transmission control system according to the invention, a microcomputer outputs current instruction signals in the form of pulse-width-modulated signals for the solenoids according to various input data. Therefore, the signal of the microcomputer is pulse-width-modulated, which makes it possible to reduce the number of output signal lines of the microcomputer, and to simplify the microcomputer itself and the D/A converter connected to the latter.

In the non-stage transmission control system according to the invention, an analog-to-digital converter is provided for subjecting a solenoid current detected to analog-to-digital conversion to obtain a digital signal, which is applied to the microcomputer. Therefore, the detection signal of the solenoid current is applied to the microcomputer, so that abnormal conditions such as for instance the grounding of the solenoid can be detected through comparison of the current instruction signal and the current detection signal.

In the non-stage transmission control system according to the invention, a resistor is connected to a circuit in which a solenoid current flows only when a current control element is non-conductive. Therefore, the resistor is connected to the circuit in which the solenoid current flows only when the current control element is non-conductive (off), so that the time constant of the circuit is decreased. Therefore, the solenoid current reduction rate is increased when the current control element is non-conductive (off), which improves the hydraulic control response.

DETAILED DESCRIPTION OF PREFERRED EMBODIMENT

One preferred embodiment of this invention will be described with reference to the accompanying drawings.

Figure 1:
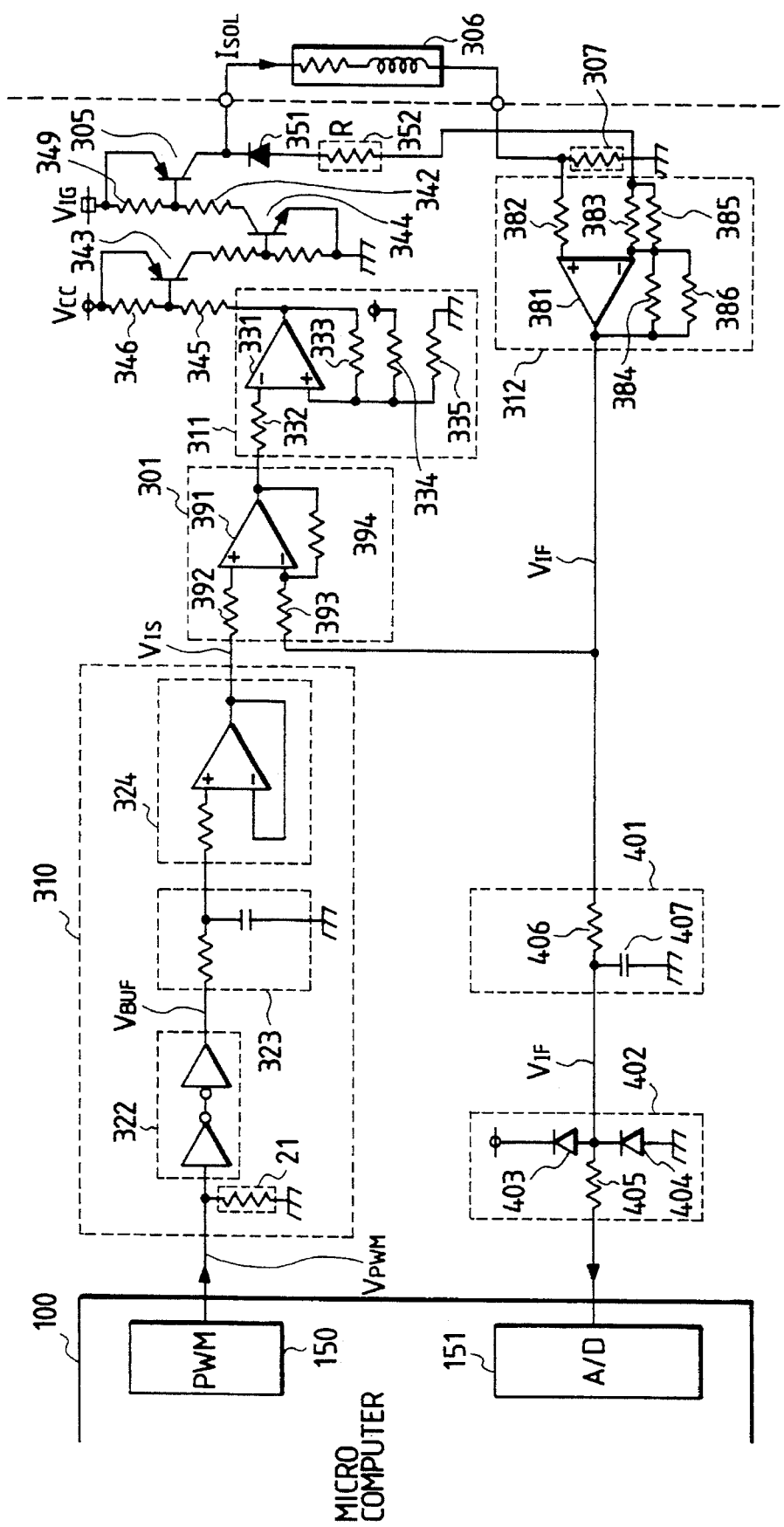
FIG. 1 is a circuit diagram showing hydraulic pressure control means in a non-stage transmission control system according to this invention.

In FIG. 1, reference numeral 150 designates a pulse width modulator built in a microcomputer 100; 151, an A/D converter in the microcomputer 100; and 310, a D/A converter for demodulating a pulse-width-modulated signal $V_{PWM}$ outputted by the pulse width modulator 150, to form a current instruction signal $V_{IS}$, the D/A converter 310 comprising a buffer logic circuit 322, a resistor 21, a smoothing filter 323, and a buffer operational amplifier 324; and 301, a difference amplifier comprising an operational amplifier 391 and resistors 392 through 394.

Further in FIG. 1, reference numeral 311 designates a pulse width modulator for providing control signals to turn on and off the current control transistor 305, the modulator 311 comprising an operational amplifier 331 and resistors 332 through 335, and having a predetermined hysteresis; 312, a current detecting and amplifying circuit comprising an operational amplifier 381 and resistors 382 through 386; 401, a smoothing filter comprising a resistor 406 and a capacitor 407; 402, a microcomputer input protective circuit comprising diodes 403 and 404 and a resistor 405; and 352, a quick break resistor. Transistors 343 and 344, and resistors 342 and 345 through 349 form an amplifier circuit for controlling the on and off states of the current control transistor 305.

The operation of the control circuit thus organized will be described.

Current is supplied from the power source $V_{IG}$ to the linear solenoid 306 as follows: That is, when the current control transistor 305 is conductive (on), current is supplied through a current path consisting of the transistor 305, the solenoid 306, and the current detecting resistor 307; whereas when the current control transistor 305 is non-conductive (off), current is supplied through the linear solenoid 306, the current detecting detector 307, the quick. break resistor 352 and the feedback diode 351. In the latter case, the current is reduced.

The current of the solenoid 306 is applied through the current detecting resistor 307 to the current detecting and amplifying circuit 312, which it is amplified into the current feedback signal $V_{IF}$. This signal $V_{IF}$, and the current instruction signal $V_{IS}$ outputted by the D/A converter 310 are applied to the difference amplifier 301, so that the latter 301 outputs a difference signal, which is applied to the pulse width modulator 311. In response to the difference signal, the pulse width modulator 311 outputs a control signal to turn on or off the current control transistor 305. On the other hand, the smoothing filter 401 removes AC components from the current feedback signal $V_{IF}$; i.e., smooths the latter. The signal $V_{IF}$ thus processed is applied to the microcomputer input protective circuit 402, where its excessively large components are suppressed. The output of the protective circuit 402 is applied to the A/D converter 151 in the microcomputer 100.

Figure 2:
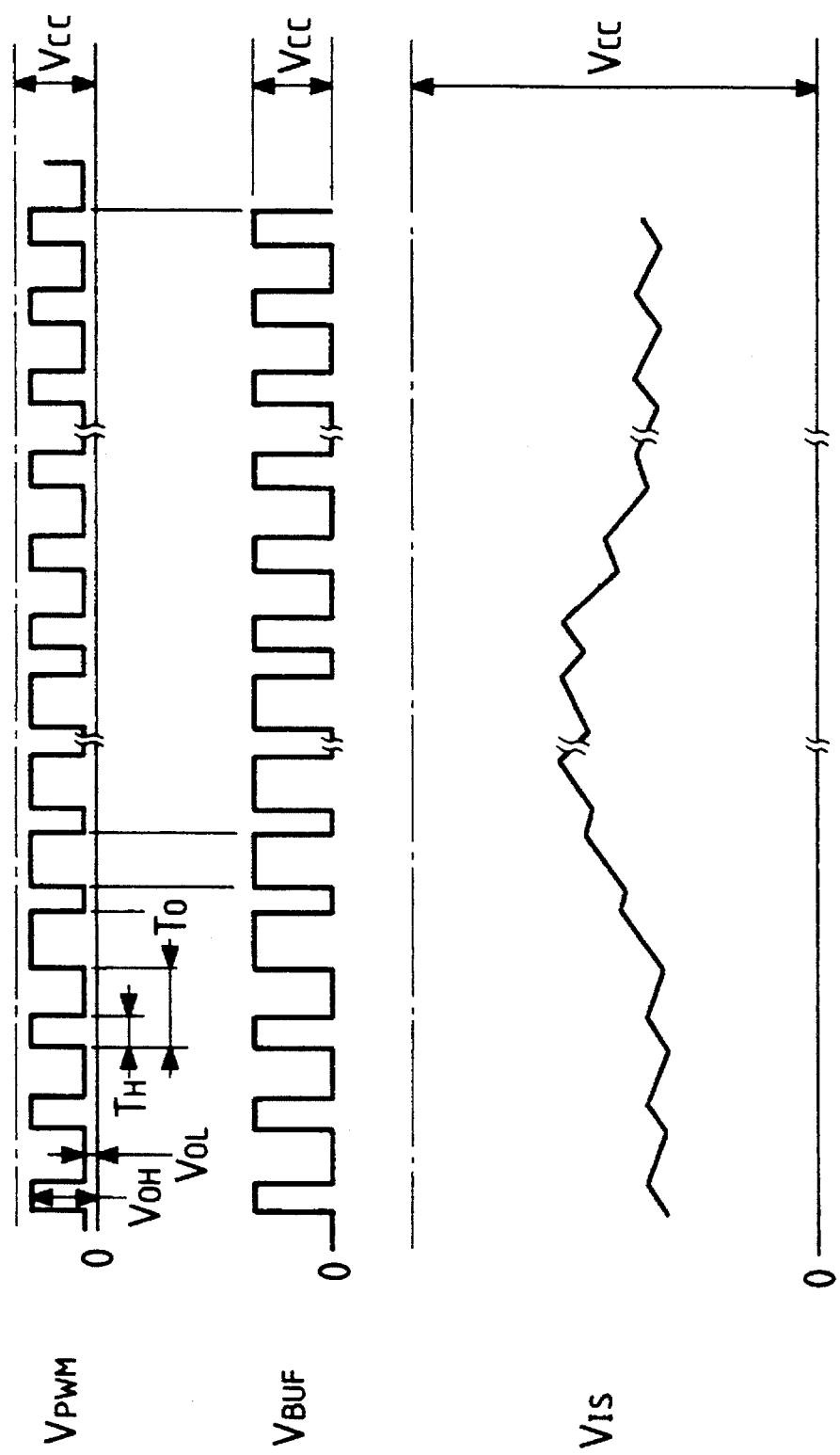
FIG. 2 is a waveform diagram showing signals at various circuit points in the hydraulic pressure control means.

FIG. 2 is a time chart showing the waveforms of signals at various circuit points in FIG. 1. More specifically, it is shown the pulse-width-modulated signal $V_{PWM}$ of the pulse width modulator 150 which is formed with a high frequency signal by pulse-width modulating, and the waveform of the output signal $V_{BUF}$ of the buffer logic circuit 322 in the D/A converter 310—with the output signal, the internal voltage signal is less, and the occurrence of D/A conversion errors is prevented. In addition, it is shown the current instruction signal Vs outputted by the D/A converter 310, which is an analog signal obtained by demodulating the pulse-width-modulated signal $V_{PWM}$ by D/A conversion.

Figure 3:
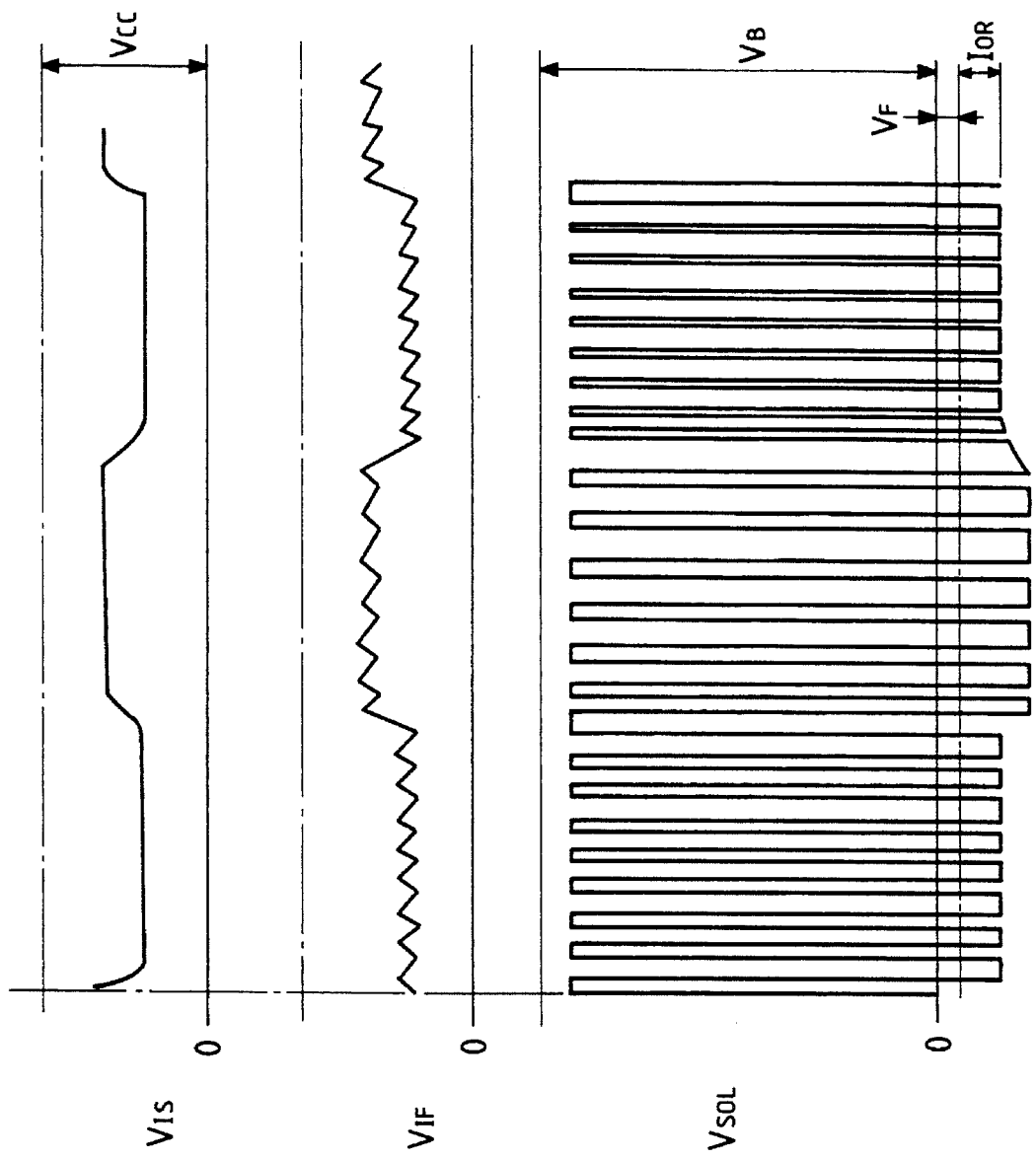
FIG. 3 is also a waveform diagram showing signals at various circuit points in the hydraulic pressure control means.
Figure 4:
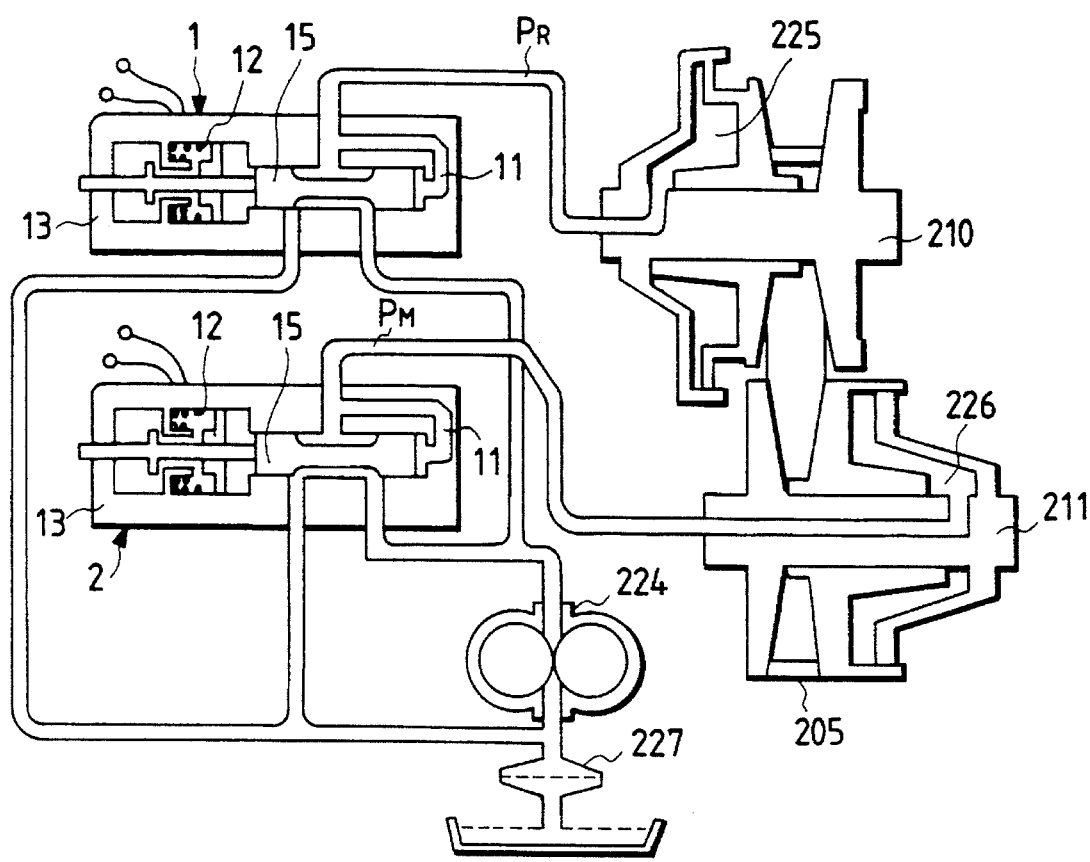
FIG. 4 is an explanatory diagram showing the arrangement of a V-belt type non-stage transmission.
Figure 6:
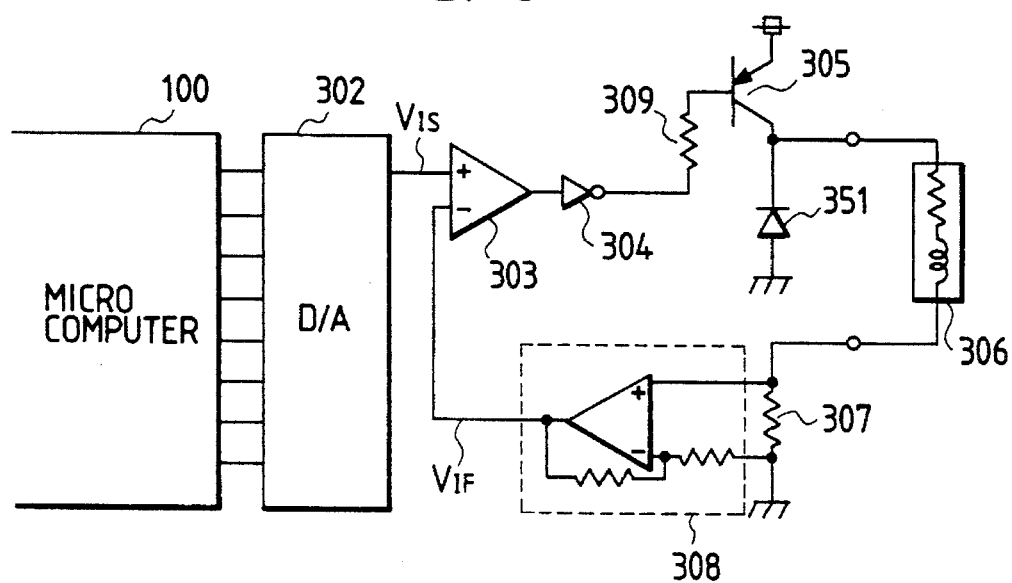
FIG. 6 is a circuit diagram, partly as a block diagram, showing conventional hydraulic pressure control means.
Figure 5:
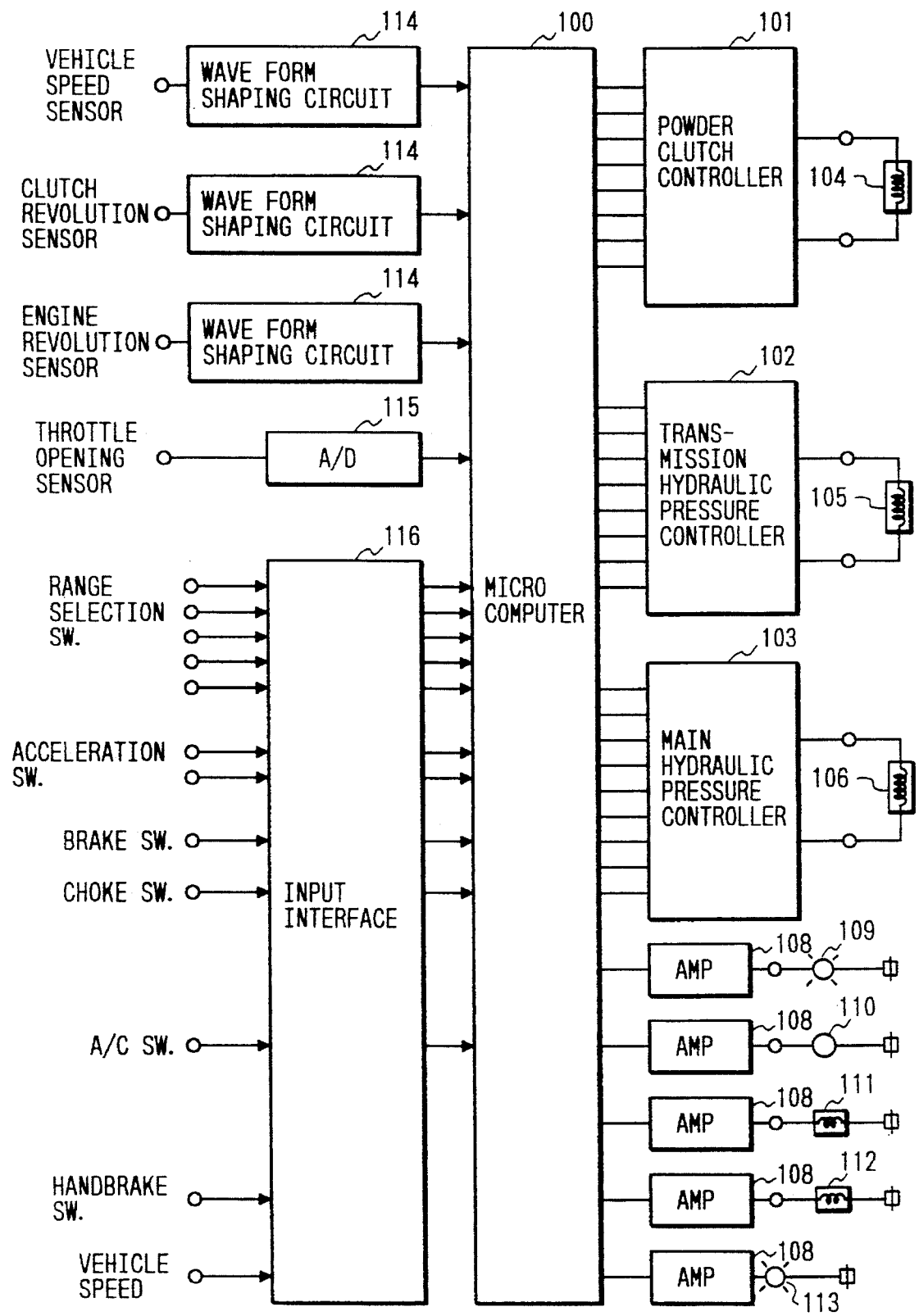
FIG. 5 is an explanatory diagram showing a non-stage transmission control system.

FIG. 3 is also a time chart showing the waveforms of signals at various circuit points in FIG. 1. More specifically, there are shown the current instruction signal $V_{IS}$ simplified, the current feedback signal $V_{IF}$ outputted by the current detecting and amplifying circuit 312, and the voltage applied to the linear solenoid 306. The pulse width modulator 311 turns on or off the current control transistor 305 according to the difference between the current instruction signal $V_{IS}$ and the current feedback signal $V_{IF}$, having a predetermined hysteresis.

The current feedback signal $V_{IF}$ is fed back to the A/D converter 151 in the microcomputer 100 through the smoothing filter 401 and the microcomputer input protective circuit 402. The smoothing capacitor 402 removes ripple components from the current feedback signal $V_{IF}$ which are formed with the on-off operations of the current control transistor 305. In the case where an alternating current signal is superposed on the current instruction signal, the filtering capacitor 402 removes the AC component from it, so that only the DC component is detected.

When the current instruction signal $V_{IS}$ is reduced to zero in level, the current control transistor 305 is rendered non-conductive (off). In this operation, the reduction in current appears as a reduction in current both in the solenoid 306 and in the feedback diode 351, and the current reduction time is determined from the coil time constant L/R of the solenoid 306. Therefore, the quick break resistor 352 is connected in series to the feedback diode 351. That is, the resistor 352 thus connected decreases the coil time constant to shorten the current reduction time thereby to improve the hydraulic pressure control response. When the current control transistor 305 is conductive (on), no current is applied to the quick break resistor 352. Therefore, the power loss attributing to the quick break resistor 352 is less.

In the above-described embodiment, a desired low frequency AC signal can be superposed on the pulse-width-modulated signal outputted by the microcomputer 100. The AC signal may be of a triangular wave, a trapezoid wave, or an approximately sinusoidal wave.

As was described above, in the control system of the invention, the microcomputer outputs the current control signal in the form of a high frequency pulse-width-modulated signal, which makes it possible to decrease the number of output signal lines of the microcomputer, with the result that the control system is simplified in circuit arrangement as much.

Further, in the control system of the invention, the current feedback signal of the solenoid is fed back to the microcomputer, and therefore the occurrence of abnormal conditions can be detected with ease.

Furthermore, in the control system of the invention, the resistor is connected to the circuit in which the solenoid current flows only when the current control element is non-conductive (off). Therefore, the connection of the resistor decreases the time constant of the circuit, which improves the hydraulic pressure control response.

What is claimed is:

1. A non-stage transmission control system comprising:

a V-belt type non-stage transmission mechanism including an input shaft and an output shaft the radii of rotation of which are variable, and a V-belt laid over said input and output shafts;

hydraulic pressure controlling solenoid valves for controlling the hydraulic pressures of cylinders adapted to vary the radii of rotation of said input and output shafts, respectively; and control means for controlling current to be applied to said hydraulic pressure controlling solenoid valves, said control means comprising:

current control element provided between an electric power source and each of said hydraulic pressure controlling solenoid valves;

a microcomputer for outputting a current instruction signal in the form of a pulse-width-modulated signal according to various input data;

a digital-to-analog converter for subjecting said pulse-width-modulated signal to digital-to-analog conversion;

current detecting means for detecting solenoid currents; and means for turning on or off said current control element according to a difference between an output of said digital-to-analog converter and an output of said current detecting means.

2. A non-stage transmission control system as claimed in claim 1, wherein said control means further comprises an analog-to-digital converter for converting a solenoid current detected into a digital signal to be applied to said microcomputer.

3. A non-stage transmission control system as claimed in claim 2, wherein a resistor is connected to a circuit in which a solenoid current flows only when said current control element is non-conductive.

4. A non-stage transmission control system as claimed in claim 1, wherein a resistor is connected to a circuit in which a solenoid current flows only when said current control element is non-conductive.

* * * * *